(12) United States Patent
Zembutsu

(10) Patent No.: US 8,191,153 B2
(45) Date of Patent: May 29, 2012

(54) COMMUNICATION SYSTEM, SERVER APPARATUS, INFORMATION COMMUNICATION METHOD, AND PROGRAM

(75) Inventor: Hajime Zembutsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/000,338

(22) PCT Filed: Jun. 24, 2009

(86) PCT No.: PCT/JP2009/061482
§ 371 (c)(1),
(2), (4) Date: Dec. 20, 2010

(87) PCT Pub. No.: WO2010/016334
PCT Pub. Date: Feb. 11, 2010

(65) Prior Publication Data
US 2011/0107403 A1 May 5, 2011

(30) Foreign Application Priority Data

Aug. 7, 2008 (JP) .................................. 2008-204496

(51) Int. Cl.
*G06F 7/04* (2006.01)
(52) U.S. Cl. ............................................. 726/26; 726/4
(58) Field of Classification Search ........... 726/4, 26–30
See application file for complete search history.

(56) References Cited

U.S. PATENT DOCUMENTS

| 7,277,948 | B2* | 10/2007 | Igarashi et al. | 709/227 |
| 7,443,824 | B1* | 10/2008 | Lipford et al. | 370/338 |
| 7,844,245 | B1* | 11/2010 | Farkhondeh et al. | 455/403 |
| 7,979,912 | B1* | 7/2011 | Roka | 726/28 |
| 2001/0036164 | A1* | 11/2001 | Kakemizu et al. | 370/331 |
| 2003/0028763 | A1* | 2/2003 | Malinen et al. | 713/155 |
| 2004/0073786 | A1* | 4/2004 | O'Neill et al. | 713/155 |
| 2004/0234075 | A1* | 11/2004 | Leung | 380/270 |
| 2005/0079869 | A1* | 4/2005 | Khalil et al. | 455/435.1 |

(Continued)

FOREIGN PATENT DOCUMENTS

EP 2023564 A1 2/2009

(Continued)

OTHER PUBLICATIONS

International Search Report for PCT/JP2009/061482 mailed Jul. 21, 2009.

(Continued)

*Primary Examiner* — Philip Chea
*Assistant Examiner* — Eric W Shepperd

(57) ABSTRACT

A communication system includes a terminal, a first server apparatus that manages the movement of the terminal, and a second server apparatus that performs authentication of the terminal. The first server apparatus uses AAA protocol to transmit a first message that includes a pseudo-NAI of the terminal to the second server apparatus. The second server apparatus both records the pseudo-NAI and true-NAI of the NAI of the terminal in association with each other and records maintenance function execution necessity information indicating whether a maintenance function must be executed for the terminal in association with the true-NAI of the terminal, and upon reception of the first message from the first server apparatus, uses AAA protocol to transmit a second message that contains the maintenance function execution necessity information that was placed in correspondence with the pseudo-NAI that was contained in the first message to the first server apparatus.

9 Claims, 4 Drawing Sheets

U.S. PATENT DOCUMENTS

| | | | |
|---|---|---|---|
| 2005/0190734 A1* | 9/2005 | Khalil et al. | 370/338 |
| 2006/0067271 A1* | 3/2006 | Chen et al. | 370/331 |
| 2007/0091843 A1* | 4/2007 | Patel et al. | 370/331 |
| 2008/0263631 A1* | 10/2008 | Wang et al. | 726/2 |
| 2009/0158398 A1* | 6/2009 | Pandey et al. | 726/4 |
| 2010/0199332 A1* | 8/2010 | Bachmann et al. | 726/4 |
| 2010/0215019 A1* | 8/2010 | Velev et al. | 370/331 |

FOREIGN PATENT DOCUMENTS

| | | |
|---|---|---|
| JP | 2007226470 A | 9/2007 |
| JP | 2008035248 A | 2/2008 |
| JP | 2008092577 A | 4/2008 |
| WO | 2007137987 A | 12/2007 |

OTHER PUBLICATIONS

A. Lior et al., "Mobile IP Key Derivation using EAP", Network Working Group, Internet-Draft, draft-lior-mipkeys-eap-00, Feb. 25. 2006, pp. 1-16.

European Search Report for EP09804821.8 dated Aug. 11, 2011.

Cisco Systems, "Radius-Based lawful Intercept", Cisco IOS Security Configuration Guide, XP002654834, Mar. 9, 2006.

A. Lior et al., "Radius Mobile IPv6 Support", draft-ietf-mip6-radius-05.txt, Network Working Group, Internet-draft, Jul. 14, 2008.

* cited by examiner

COMMUNICATION SYSTEM, SERVER APPARATUS, INFORMATION COMMUNICATION METHOD, AND PROGRAM

The present application is the National Phase of PCT/JP2009/061482, filed Jun. 24, 2009, which claims priority based on Japanese Patent Application No. 2008-204496 for which application was submitted on Aug. 7, 2008 and incorporates all of the disclosures of that application.

TECHNICAL FIELD

The present invention relates to a communication system, a server apparatus, an information communication method, and a program.

BACKGROUND ART

A wireless communication system such as shown in FIG. 1 is prescribed in the specification decided upon in the WiMAX (Worldwide Interoperability for Microwave Access) Forum.

As shown in FIG. 1, the WiMAX wireless communication system includes: MS (mobile station) 10, BS (Base Station) 20 and ASN-GW (ASN-Gateway) 30 arranged in an ASN (Access Service Network); and HA (Home Agent) 40 and AAA (Authentication, Authorization, Accounting) server 50 arranged in a CSN (Connectivity Service Network) (for example, see Patent Documents 1 and 2, which are Japanese published patent applications JP-A-2008-035248 and JP-A-2008-092577, respectively).

BS 20 is a base station that carries out wireless communication with MS 10, which is a terminal, and ASN-GW 30 is a gateway apparatus that connects MS 10 to CSN by way of BS 20.

HA 40 is a server apparatus that manages the movement of MS 10, and AAA server 50 is a server apparatus that carries out authentication, authorization, and accounting of MS 10. In FIG. 1, HA 40 is connected to the Internet, but HA 40 can also be connected to an IP (Internet Protocol) network (such as an in-company network) other than the Internet.

In a WiMAX wireless communication system, device authentication that authenticates whether MS 10 is connected to the ASN and user authentication that authenticates whether the user of MS 10 is party to a contract for service of the ASN are carried out as authentication for MS 10.

The device/user authentication sequence in a related WiMAX wireless communication system is next described with reference to FIG. 2.

A device/user authentication sequence is here described in which Proxy Mobile IPv4 is applied.

In addition, it is assumed that prior to the device/user authentication sequence shown in FIG. 2, BS 20 acquires from MS 10 the MAC (Media Access Control) address of MS 10 in a DL (Down Link)—MAP (Media Access Protocol) sequence (not shown in the figure), ASN-GW 30 acquires from BS 20 the MAC address of MS 10 in an MS—PreAttachment sequence (not shown in the figure), and MS 10 is identifiable by means of the MAC address within the ASN.

As shown in FIG. 2, ASN-GW 30 in Step S401 uses Auth.Relay protocol to transmit to MS 10 by way of BS 20 an EAP RQ (request)/Identity message that requests the start of device/user authentication and the sending of Identity by means of EAP (Extensible Authentication Protocol).

As a response to the EAP RQ/Identity message, MS 10 in Step S402 next uses EAP to transmit an EAP RP (Response)/Identity message that includes a pseudo-identity, which is the pseudo-NAI (Network Access Identity) of MS 10, and a MAC address to AAA server 50 by way of BS 20 and ASN-GW 30.

In this way, ASN-GW 30 acquires the pseudo-identity of MS 10 and places the pseudo-identity in correspondence with the acquired MAC address. In addition, AAA server 50 acquires the pseudo-identity and MAC address of MS 10.

Upon success in device authentication for MS 10, AAA server 50 next uses EAP to transmit a message reporting the success of the device authentication (the name of this message differs according to the authentication method) to MS 10 by way of ASN-GW 30 and BS 20 in Step S403. In Step S404, AAA server 50 further transmits an EAP RQ message requesting the transmission of the true-identity, which is the true NAI of MS 10, to MS 10 by way of ASN-GW 30 and BS 20.

In Step S405, MS 10 next uses EAP to transmit to AAA server 50 by way of BS 20 and ASN-GW 30 an EAP RP message that contains the true-identity of MS 10 as a response to the EAP RQ message.

AAA server 50 thus acquires the true-identity of MS 10 and places the true-identity in association with the acquired pseudo-identity.

Upon succeeding in the user authentication for MS 10, AAA server 50 next in Step S406 uses EAP to transmit an EAP Success message reporting the success in the user authentication to ASN-GW 30. In Step S407, ASN-GW 30 then uses Auth.Relay protocol to transfer the EAP Success message to MS 10 by way of BS 20.

In order to establish a session, MS 10 next uses DHCP (Dynamic Host Configuration Protocol) to transmit to ASN-GW 30 by way of BS 20 a DHCP Discover message requesting assignment of an IP (Internet Protocol) address.

In Step S409, ASN-GW 30 then uses Mobile IP to transmit to HA 40 an RRQ (Registration Request) message that includes the pseudo-identity of MS 10 requesting connection to the CSN of MS 10.

HA 40 thus acquires the pseudo-identity of MS 10. As a result, HA 40 is subsequently able to use the NAI as user identity information.

At this time, the reason that the NAI that is reported to HA 40 is a pseudo-identity is as follows. Specifically, the NAI that is reported from ASN-GW 30 to HA 40 is included in the Extension field of the Mobile IP, whereby plain data flows to the ASN and CSN unless a security tunnel such as IPsec (Security Architecture for IP) is used. As a result, in a WiMAX wireless communication system, only MS 10 and AAA server 50 use the true-identity and other nodes use the pseudo-identity. As a result, the NAI that is reported from ASN-GW 30 to HA 40 is the pseudo-identity. In addition, the correspondence table of pseudo-identity and true-identity is held only by MS 10 and AAA server 50.

In Step S410, HA 40 next uses an AAA protocol (for example, RADIUS (Remote Access Dial In User Service) protocol) to transmit to AAA server 50 an Access Request message that includes the pseudo-identity of MS 10 requesting the result of authenticating MS 10.

In Step S411, AAA server 50 next uses an AAA protocol to transmit to HA 40 an Access Accept message reporting the result of authenticating MS 10 as a response to the Access Request message.

HA 40 thus verifies the result of authenticating MS 10.

In Step S412, HA 40 next uses Mobile IP to transmit to ASN-GW 30 a RRP (Registration Response) message reporting permission to connect to the CSN of MS 10 as a response to the RRQ message.

In Step S413, ASN-GW 30 then uses DHCP to transmit to MS 10 by way of BS 20 a DHCP Offer message reporting a candidate IP address to be assigned to MS 10 as the response to the DHCP Discover message.

MS 10 thus acquires an IP address and begins the process for establishing a session.

In this way, MS 10 uses three identities: the true-identity, the pseudo-identity, and the MAC address, as its own user identification information in a WiMAX wireless communication system.

BS 20 and ASN-GW 30 are able to use two of these, the pseudo-identity and the MAC address, as the user identification information of MS 10.

HA 40 is able to use only the pseudo-identity as the user identification information of MS 10.

Finally, AAA server 50 is able to use the three identities, the true-identity, the pseudo-identity, and the MAC address, as the user identification information of MS 10.

LITERATURE OF THE PRIOR ART

Patent Documents

Patent Document 1: JP-A-2008-035248
Patent Document 2: JP-A-2008-092577

SUMMARY OF THE INVENTION

Problem to be Solved by the Invention

Each of the nodes MS 10, BS 20, ASN-GW 30, HA 40, and AAA server 50 are equipped with maintenance functions that are executed for the user of MS 10. Examples of the maintenance functions are next described.

Signal Monitoring Function

This is a function of recording signals relating to a designated user. For example, of the signals that are transferred using Mobile IP and AAA protocol, HA 40 records those signals relating to a designated user.

Connection Regulation Function

This is a function of rejecting the connection request of a designated user. For example, as a response to an RRQ message requesting connection to the CSN of a designated user, HA 40 returns an error by the RRP message.

Congestion Regulation Exception Function

This is a function of accepting a connection request by an RRQ message of only a designated user even when in the state of discarding connection requests from general users. For example, HA 40 accepts a connection request of only a designated user even when HA 40 is in an HA congestion state.

Communication Interception Function

This is a function of recording the communication data of a designated user. For example, after the generation of a tunnel for passing communication data that are transferred using Mobile IP, HA 40 records communication data that are actually transferred between MS 10 and the CSN by way of this tunnel.

However, the maintenance functions that are executed for a user differ for each user. For example, although all of the above-described four maintenance functions are executed for a particular user, only the congestion regulation exception function among the above-described four maintenance functions is executed for another user.

Accordingly, in order to execute a maintenance function, each node must first designate a user who is connected to its own node and then determine whether a maintenance function is to be executed for that user.

MS 10 and AAA server 50 are able to manage users using their true-identities and therefore have no problem in designating users.

BS 20 and ASN-GW 30, while being components that do not know true-identities, carry out user management by the MAC address apart from the NAI and therefore can carry out user designation.

However, HA 40 can carry out user management by only the pseudo-identity.

Because the uniqueness of a pseudo-identity is guaranteed in each session, following the establishment of a session, HA 40 is able to carry out user designation from the session. However, a pseudo-identity in some cases is random-number generated by MS 10 in an authentication sequence by means of EAP, and the problem therefore arises that HA 40 is unable to designate a user before the establishment of a session and is thus unable to determine whether or not a maintenance function must be executed.

In addition, when there is no correspondence table of pseudo-identities and true-identities held by other nodes, the problem arises that HA 40 is unable to designate the user of a Mobile IP session and is unable to determine whether or not a maintenance function must be executed.

It is therefore an object of the present invention to provide a communication system, a server apparatus, an information communication method, and a program that enable a solution to any of the above-described problems.

Means for Solving the Problem

The communication system of the present invention includes a terminal, a first server apparatus that manages the movement of the terminal; and a second server apparatus that performs authentication of the terminal; wherein:

the first server apparatus uses an AAA protocol to transmit a first message that includes a pseudo-NAI of the terminal to the second server apparatus; and the second server apparatus:

both records a pseudo-NAI and true-NAI of the NAI of the terminal in association with each other and records maintenance function execution necessity information indicating whether a maintenance function must be executed for the terminal in association with the true-NAI of the terminal; and upon reception of the first message from the first server apparatus, uses an AAA protocol to transmit to the first server apparatus a second message that contains the maintenance function execution necessity information that was placed in correspondence with the pseudo-NAI that is contained in the first message.

The server apparatus of the present invention is a server apparatus that performs authentication of a terminal, and includes:

a recording unit that both records a pseudo-NAI and true-NAI of the NAI of the terminal in association with each other and records maintenance function execution necessity information indicating whether a maintenance function must be executed for the terminal in association with the true-NAI of the terminal;

a reception unit that receives a first message that contains a pseudo-NAI of the terminal that is transmitted in using an AAA protocol from another server apparatus that manages movement of the terminal;

a control unit that, upon reception of the first message from the other server apparatus, includes the maintenance function execution necessity information that was placed in correspondence with the pseudo-NAI contained in the first message in a second message; and a transmission unit that uses the AAA protocol to transmit the second message to the other server apparatus.

The information communication method of the present invention is realized by a server apparatus that performs authentication of a terminal and includes:

a recording step of both recording a pseudo-NAI and true-NAI of the NAI of the terminal in association with each other and recording maintenance function execution necessity information indicating whether a maintenance function must be executed for the terminal in association with the true-NAI of the terminal;

a reception step of receiving a first message that contains a pseudo-NAI of the terminal that is transmitted in using an AAA protocol from another server apparatus that manages movement of the terminal;

a control step of, upon reception of the first message from the other server apparatus, including the maintenance function execution necessity information that was placed in correspondence with the pseudo-NAI contained in the first message in a second message; and a transmission step of using the AAA protocol to transmit the second message to the other server apparatus.

The program of the present invention causes a server apparatus that performs authentication of a terminal to execute:

a recording procedure of both recording a pseudo-NAI and true-NAI of the NAI of the terminal in association with each other and recording maintenance function execution necessity information indicating whether a maintenance function must be executed for the terminal in association with the true-NAI of the terminal;

a reception procedure of receiving a first message that contains the pseudo-NAI of the terminal that is transmitted in using an AAA protocol from another server apparatus that manages movement of the terminal;

a control procedure of, upon reception of the first message from the other server apparatus, including the maintenance function execution necessity information that was placed in association with the pseudo-NAI that was contained in the first message in a second message; and a transmission procedure of using the AAA protocol to transmit the second message to the other server apparatus.

Effect of the Invention

According to the communication system of the present invention, the second server apparatus uses the AAA protocol to transmit to the first server apparatus a second message that contains maintenance function execution necessity information that corresponds to the pseudo-NAI contained in a first message that was received from the first server apparatus.

Accordingly, the effect is obtained that after receiving the second message, the first server apparatus is able to check maintenance function execution necessity information and thus determine whether a maintenance function must be executed even without holding a correspondence table of pseudo-NAI and true-NAI.

BEST MODE FOR CARRYING OUT THE INVENTION

A best mode of carrying out the present invention is next described with reference to the accompanying drawings.

In the exemplary embodiment that is described hereinbelow, a case is described in which the communication system of the present invention is a WiMAX wireless communication system, but the present invention is not limited to this form and may also be a wireless communication system of another communication mode, a wired communication system, or a mixed wireless/wired communication system.

Figure 1:
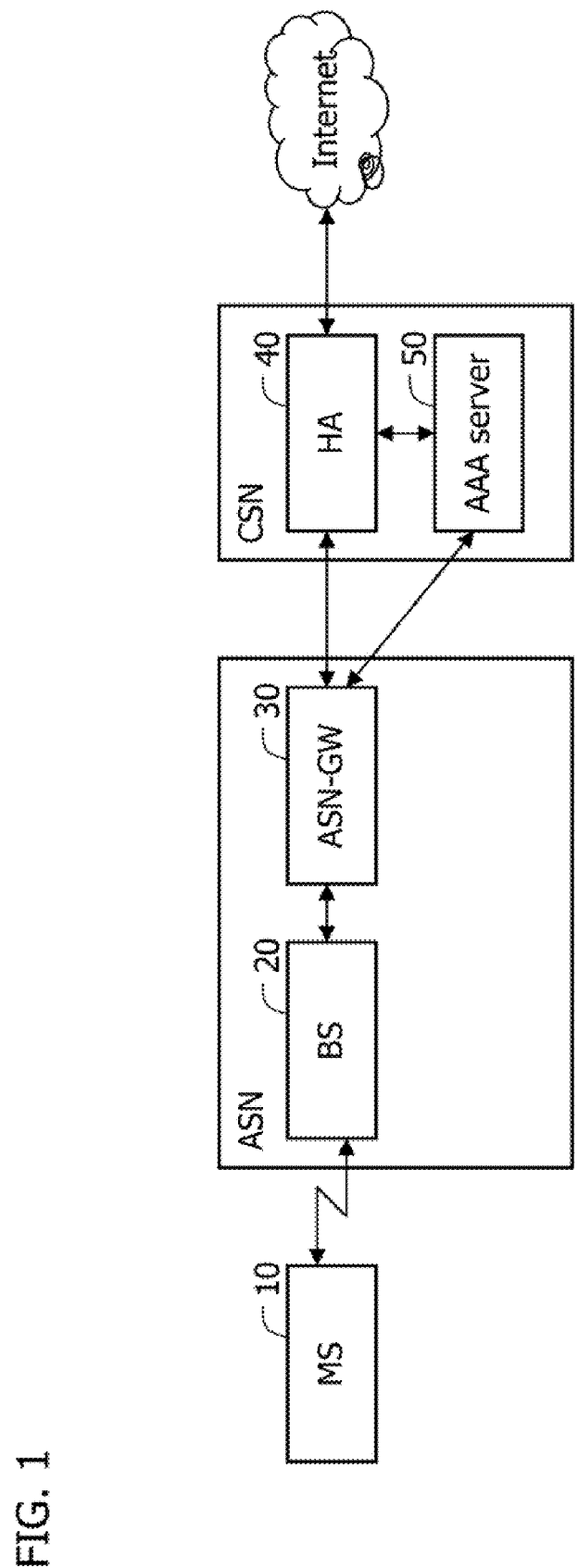
FIG. 1 shows the overall configuration of a wireless communication system.
Figure 2:
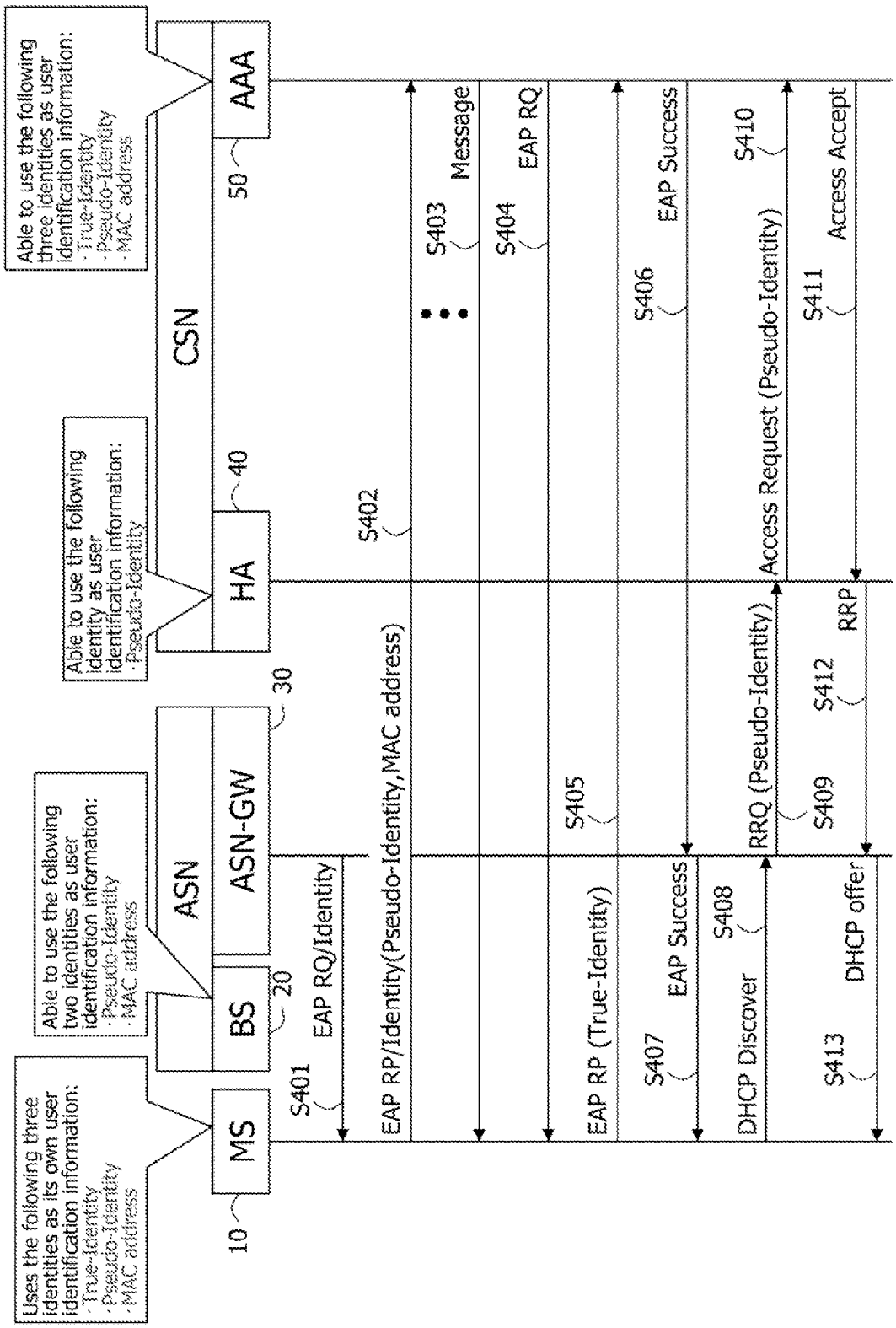
FIG. 2 is a sequence diagram for explaining the device/user authentication sequence in a related wireless communication system.
Figure 4:
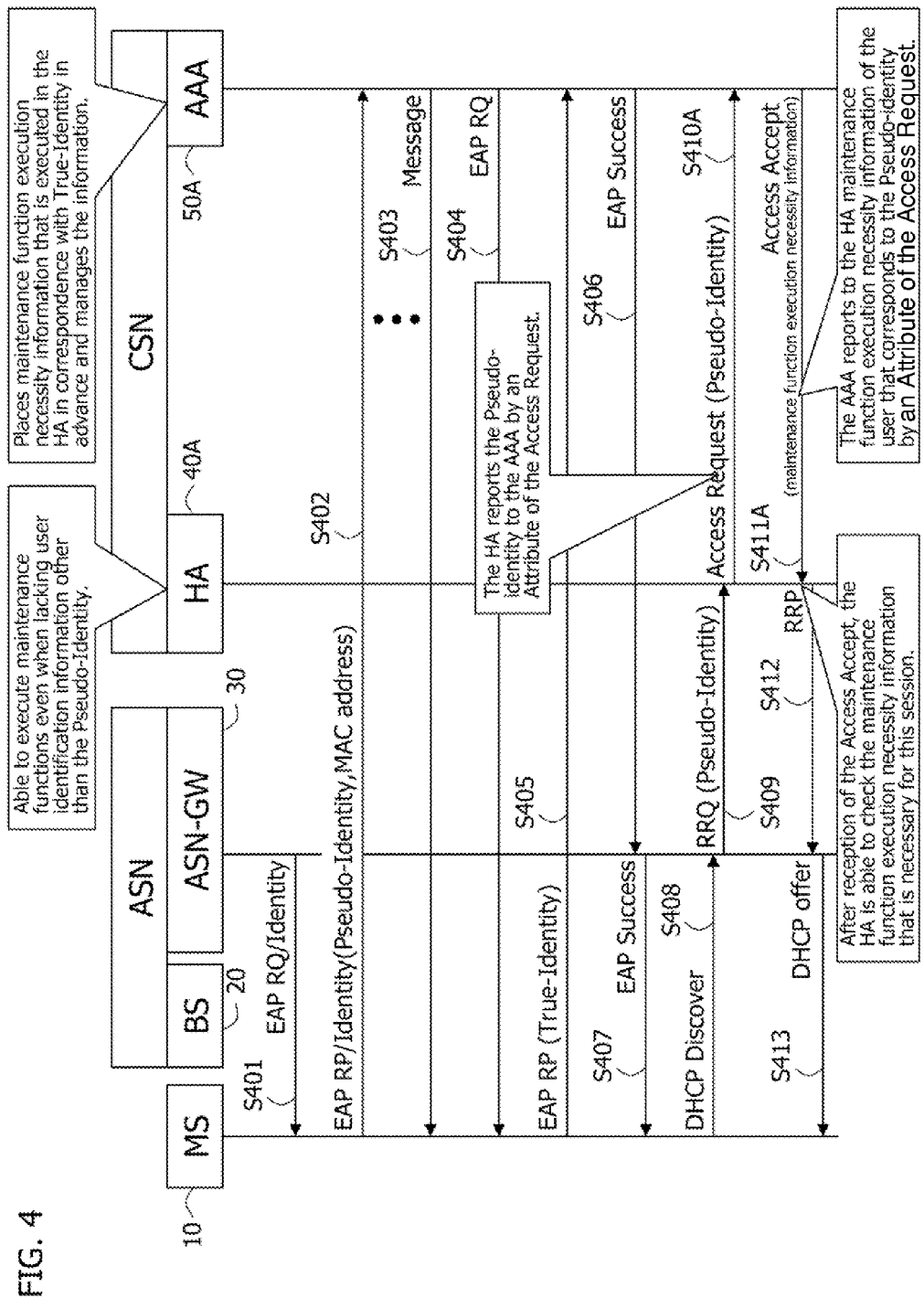
FIG. 4 is a sequence diagram for describing the device/user authentication sequence in the wireless communication system of an exemplary embodiment of the present invention.

The wireless communication system of the present exemplary embodiment is a wireless communication system in which HA 40 and AAA server 50 of the constituent elements of the wireless communication system of FIG. 1 are converted to HA 40A of FIG. 4 and AAA server 50A of FIG. 4 and Steps S410 and S411 of FIG. 4 relating to the Access Request message and Access Accept message of the processes in the device/user authentication sequence of FIG. 2 are converted to Steps S410A and S411A of FIG. 4.

The following explanation focuses on HA 40A and AAA server 50A that carry out the processes relating to the Access Request message and Access Accept message.

Figure 3:
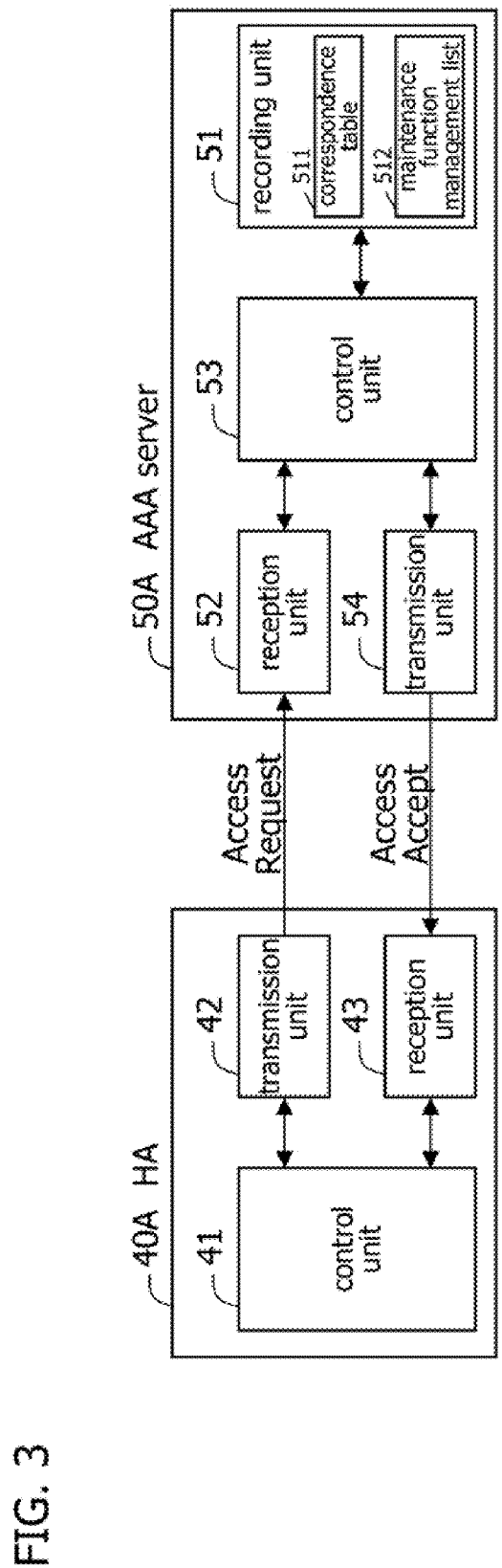
FIG. 3 is a block diagram showing the configuration of the HA and AAA server in the wireless communication system of an exemplary embodiment of the present invention.

FIG. 3 is a block diagram showing the configuration of HA 40A and AAA server 50A in the present exemplary embodiment. FIG. 3 shows only the configuration of portions that carry out the processes relating to the Access Request message and Access Accept message.

As shown in FIG. 3, HA 40A in the present exemplary embodiment includes control unit 41, transmission unit 42, and reception unit 43.

Control unit 41 adds an Attribute field to the Access Request message and includes the pseudo-identity of MS 10 in this Attribute field.

Transmission unit 42 uses an AAA protocol to transmit to AAA server 50A an Access Request message in which a pseudo-identity has been included in the Attribute field by control unit 41.

Reception unit 43 receives the Access Accept message that has been transmitted in using AAA protocol from AAA server 50A.

As shown in FIG. 3, AAA server 50A in the present exemplary embodiment includes recording unit 51, reception unit 52, control unit 53, and transmission unit 54.

Recording unit 51 records correspondence table 511 and maintenance function management list 512.

The pseudo-identity and true-identity of MS 10 that are acquired in the device/user authentication sequence are recorded in association with each other in correspondence table 511.

Maintenance function execution necessity information indicating whether a maintenance function that is executed by HA 40A for MS 10 must be executed is recorded in maintenance function management list 512 in association with the true-identity of MS 10 and is recorded for each true-identity (for each user). For example, recording unit 51 records maintenance function management list 512 such as shown in Table 1 for each true-identity.

TABLE 1

| Maintenance function list | Maintenance function execution necessity information |
|---|---|
| Signal monitoring function | Not executed |
| Connection regulation function | Not executed |
| Congestion regulation exclusion function | Execute |
| Communication interception function | Not executed |
| . | . |
| . | . |
| . | . |

Reception unit 52 receives an Access Request message that is transmitted in using an AAA protocol from HA 40A.

Control unit 53, upon the reception of the Access Request message in reception unit 52, extracts from correspondence table 511 the true-identity that corresponds to the pseudo-identity contained in the Attribute field of the Access Request message that was received.

In addition, control unit 53 extracts from maintenance function management list 512 the maintenance function execution necessity information that corresponds to the true-identity that was extracted as described above.

Control unit 53 further adds an Attribute field to the Access Accept message and includes the maintenance function execution necessity information that was extracted as described above to the Attribute field.

Transmission unit 54 next uses an AAA protocol to transmit to HA 40A the Access Accept message in which the maintenance function execution necessity information was included in the Attribute field by control unit 53.

The device/user authentication sequence in the present exemplary embodiment is next described with reference to FIG. 4. In FIG. 4, the same reference numbers are used as in similar steps in FIG. 2.

As shown in FIG. 4, the processes of Steps S401~S409, which are the same as those in FIG. 2, are first carried out.

Next, in Step S410A, HA 40A includes the pseudo-identity that is contained in an RRQ message received from ASN-GW 30 in Step S409 in the Attribute field of an Access Request message and uses an AAA protocol to transmit the Access Request Message to AAA server 50A.

Next, in Step S411A, AAA server 50A extracts from correspondence table 511 the true-identity that corresponds to the pseudo-identity contained in the Access Request message that was received from HA 40A. AAA server 50A next extracts from maintenance function management list 512 the maintenance function execution necessity information that corresponds to the true-identity that was extracted as described above. AAA server 50A then includes the maintenance function execution necessity information that was extracted as described above in the Attribute field of an Access Accept message and uses AAA protocol to transmit the Access Accept message to HA 40A.

The processes of Steps S412 and S413 that are the same as in FIG. 2 are then carried out.

In the present exemplary embodiment as described hereinabove, AAA server 50A uses an AAA protocol to report to HA 40A by means of Access Accept message maintenance function execution necessity information that indicates whether to execute a maintenance function for MS 10 that is attempting to establish a session.

As a result, following the reception of the Access Accept message, HA 40A is able to check the maintenance function execution necessity information that is necessary for the session that MS 10 is attempting to establish.

As a result, HA 40A is able to determine whether a maintenance function must be executed before establishment of a session even though it lacks user identification information other than a pseudo-identity or a correspondence table of pseudo-identity and true-identity.

Although the present invention has been described with reference to an exemplary embodiment, the present invention is not limited to the above-described exemplary embodiment. The constitution and details of the present invention are open to various modifications within the scope of the present invention that will be clear to one of ordinary skill in the art.

For example, although a device/user authentication sequence was described in the present exemplary embodiment for a case in which Proxy Mobile IPv4 was applied, the present invention is not limited to this form, and another device/user authentication sequence (such as a sequence in which Client Mobile IPv4 is applied) may also be applied.

In addition, the method carried out in HA 40A and AAA server 50A of the present invention may also be applied to a program for causing execution by a computer. This program can be stored in a storage medium and can also be provided to the outside by way of a network.

What is claimed is:

1. A communication system comprising a terminal, a first server apparatus managing movement of said terminal; and a second server apparatus performing authentication of said terminal; wherein:

said first server apparatus uses an AAA (Authentication, Authorization, Accounting) protocol to transmit a first message including a pseudo-NAI (Network Access Identity) of said terminal to said second server apparatus; and said second server apparatus:

records a pseudo-NAI and true-NAI of said terminal in association with each other and records maintenance function execution necessity information indicating whether a maintenance function must be executed for said terminal in association with the true-NAI of said terminal; and upon reception of said first message from said first server apparatus, uses the AAA protocol to transmit to said first server apparatus a second message containing the maintenance function execution necessity information recorded in correspondence with the pseudo-NAI contained in said first message, wherein said first server apparatus is a home agent (HA) server, and said second server apparatus is an AAA server, and wherein said maintenance function execution necessity information concerns said maintenance function.

2. The communication system as set forth in claim 1, wherein:

said first message is an Access Request message, and
said second message is an Access Accept message.

3. The communication system as set forth in claim 2, wherein:

said first server apparatus adds an Attribute field to said Access Request message and includes said pseudo-NAI in said Attribute field of said Access Request message; and said second server apparatus adds an Attribute field to said Access Accept message and includes said maintenance function execution necessity information to said Attribute field of said Access Accept message.

4. A server apparatus to perform authentication of a terminal, comprising:

a recording unit implemented at least in hardware to record a pseudo-NAI and true-NAI of said terminal in association with each other and to record maintenance function execution necessity information indicating whether a maintenance function must be executed for said terminal in association with the true-NAI of said terminal;

a reception unit implemented at least in hardware to receive a first message containing a pseudo-NAI of said terminal transmitted using an AAA protocol from another server apparatus managing movement of said terminal;

a control unit implemented at least in hardware to, upon reception of said first message from said another server apparatus, include the maintenance function execution necessity information recorded in correspondence with the pseudo-NAI contained in said first message in a second message; and a transmission unit implemented at least in hardware to use the AAA protocol to transmit said second message to said another server apparatus, wherein said another server apparatus is a home agent (HA) server, and said server apparatus is an AAA server, and wherein said maintenance function execution necessity information concerns said maintenance function.

5. The server apparatus as set forth in claim 4, wherein:
said first message is an Access Request message; and
said second message is an Access Accept message.

6. The server apparatus as set forth in claim 5, wherein said control unit adds an Attribute field to said Access Accept message and includes said maintenance function execution necessity information in said Attribute field.

7. An information communication method that is realized by a server apparatus to perform authentication of a terminal, comprising:

a recording step of recording a pseudo-NAI and true-NAI of said terminal in association with each other and recording maintenance function execution necessity information indicating whether a maintenance function must be executed for said terminal in association with the true-NAI of said terminal;

a reception step of receiving a first message containing a pseudo-NAI of said terminal transmitted using an AAA protocol from another server apparatus managing movement of said terminal;

a control step of, upon reception of said first message from said another server apparatus, including the maintenance function execution necessity information recorded in correspondence with the pseudo-NAI contained in said first message in a second message; and a transmission step of using the AAA protocol to transmit said second message to said another server apparatus, wherein said another server apparatus is a home agent (HA) server, and said server apparatus is an AAA server, and wherein said maintenance function execution necessity information concerns said maintenance function.

8. The information communication method as set forth in claim 7, wherein:
said first message is an Access Request message; and
said second message is an Access Accept message.

9. The information communication method as set forth in claim 8, wherein, in said control step, an Attribute field is added to said Access Accept message; and said maintenance function execution necessity information is included in said Attribute field.

* * * * *